(12) United States Patent
Merte (10) Patent No.: US 6,324,261 B1
(45) Date of Patent: Nov. 27, 2001

(54) DOOR ANSWERING MACHINE

(76) Inventor: Donald A. Merte, 22 Mapleview Rd., Poughkeepsie, NY (US) 12603

( * ) Notice: Subject to any disclaimer, the term of this patent is extended or adjusted under 35 U.S.C. 154(b) by 0 days.

(21) Appl. No.: 09/069,067

(22) Filed: Apr. 28, 1998

Related U.S. Application Data (60) Provisional application No. 60/045,777, filed on May 5, 1997.

(51) Int. Cl.[7] .............................. H04M 1/64; H04M 1/00
(52) U.S. Cl. ......................... 379/68; 379/67.1; 379/445; 379/102.06
(58) Field of Search ........................ 379/102.01, 102.06, 379/445, 159, 446, 455, 447, 330, 67.1, 68, 76, 88.11

(56) References Cited

U.S. PATENT DOCUMENTS

| | | | |
|---|---|---|---|
| 4,715,060 | * | 12/1987 | Lipscher et al. ........................ 379/70 |
| 4,764,953 | * | 8/1988 | Chern et al. ........................... 379/355 |
| 5,148,468 | * | 9/1992 | Marrick et al. ........................ 379/167 |
| 5,170,907 | * | 12/1992 | Sakai ..................................... 220/481 |
| 5,303,300 | * | 4/1994 | Eckstein ........................... 379/102.06 |
| 5,428,388 | * | 6/1995 | von Bauer et al. ................... 348/155 |
| 5,570,083 | * | 10/1996 | Johnson ................................ 340/692 |
| 5,657,380 | * | 8/1997 | Mozer ................................ 379/88.01 |
| 5,870,902 | * | 2/1999 | Garrett, Jr. ........................... 62/259.1 |
| 5,898,775 | * | 4/1999 | Niemo et al. ......................... 379/446 |
| 5,903,869 | * | 5/1999 | Jacobson et al. ..................... 704/272 |
| 5,914,826 | * | 6/1999 | Smallwood ............................ 360/12 |
| 5,973,591 | * | 10/1999 | Schwartz et al. ................. 340/384.7 |
| 6,041,106 | * | 3/2000 | Parsadayan et al. ............ 379/102.06 |

FOREIGN PATENT DOCUMENTS

2337658 A * 11/1999 (GB) ............................. H04M/11/02

* cited by examiner

Primary Examiner—Fan Tsang
Assistant Examiner—Ovidio Escalante
(74) Attorney, Agent, or Firm—Alfred M. Walker (57) ABSTRACT

A door answering machine records a short verbal message of a visitor at a door of a building. The door answering machine includes a voice message recorder for recording verbal messages, a power source for the voice message recorder for recording verbal messages; as well as a lockable holder for the voice message recorder. The voice message recorder has a manually operable record function button which operates the recorder. A message retrieval and playback feature retrieves and plays back the visitor's recorded verbal messages. Optionally, the door answering machine can be alternately used as either a voice message recorder or as a sound annunciator, such as a door chime or door bell. An optional sliding switch actuator urges the record button and then releases the record button upon a reverse sliding excursion of the sliding switch actuator.

24 Claims, 10 Drawing Sheets

DOOR ANSWERING MACHINE

RELATED APPLICATIONS

This application is based in part upon my provisional application No. 60/045,777 filed on May 5, 1997.

FIELD OF THE INVENTION

The present invention relates to voice message recorders for building entrances, such as doors thereof.

BACKGROUND OF THE INVENTION

At small businesses, homes (houses, condos, and apartments), hotel rooms, hospital rooms, college dorms, offices, etc. often visitors arrive at the door, but the door is not answered because the occupant is not in or is otherwise unable or unwilling to answer the door.

Sometimes the visitor will leave a note attached to the door to say that they were there and to the describe the nature of the visit. To leave a note, the visitor must have paper, pen, and tape to attach the note to the door. In addition, wind, vandals or rain can detach the note so that it is lost.

Also, the attachment of a note to a door may signify that the home or office is unoccupied to those seeking an opportunity to burglarize it. The problem of answering a phone when the occupant is out has been solved by the telephone answering machine. Although elaborate intercom systems for manually answering door inquiries are well known, simple voice message recorders for use at the door are not available.

OBJECTS OF THE INVENTION

The present invention is a door answering machine. Such a machine is used to record a short verbal message at the door. Several embodiments are described which fulfill the following objectives:

An object of the present invention is to provide a lockable holder for a commercially available solid-state voice message recorder to convert it into a door answering machine.

A further object is to convert the commercially available voice message recorder into a "hold the button while you speak" variety for ease of use as a door answering machine.

Another object of the present invention is to design a special purpose solid-state voice message recorder with one or more outgoing messages for use as a door answering machine.

Yet another object is to offer a time display and message time stamp feature for the door answering machine.

A further object of the present invention is to provide a door answering machine for mounting on the inside of a door.

Another object is for the inside door answering machine to be easily replaced with mechanical chimes or an electronic annunciator.

A further object of the present invention is to provide an inside door answering machine that is rechargeable and can therefore be solid-state or based on tape recorder technology.

Another object is to provide a rain shield accessory for the door answering machine.

It is yet another object to improve over the disadvantages of the prior art.

SUMMARY OF THE INVENTION

In keeping with these objects and others which may become apparent, the present invention is a door answering machine that records a short verbal message of a visitor at a door of a building. The door answering machine includes a voice message recorder for recording verbal messages, a power source for the voice message recorder for recording verbal messages, as well as a lockable holder for the voice message recorder. The voice message recorder has a manually operable record function button which operates the recorder. A message retrieval and playback feature retrieves and plays back the visitor's recorded verbal messages.

Optionally, the door answering machine can be alternately used as either a voice message recorder or as a sound annunciator, such as a door chime or door bell In case of inclement weather, a rain shield enclosure encloses the door answering machine, and includes a waterproof, transparent and sound transitive cover covering the recorder.

In one embodiment, a traditional voice message recorder can be modified with a sliding switch actuator which alternately urges the record button and then releases the record button upon a reverse sliding excursion of the sliding switch actuator.

In the preferred embodiment, there is provided a voice record/playback member communicating with a microcontroller, which receives analog audio input from a microphone, wherein the microcontroller drives an audio output to a loudspeaker outside of the door. A time-of-day module may also communicate with the microcontroller.

BRIEF DESCRIPTION OF THE DRAWINGS

The present invention can best be understood in connection with the accompanying drawings, in which.

DETAILED DESCRIPTION OF THE INVENTION

With the advent of small solid-state personal message recorders, the technology for an inexpensive, yet effective, door answering machine has been demonstrated. By combining one of these commercially available recorders with a lockable holder mounted to the outside surface of a door (or adjacent to it), a basic door answering machine is provided.

Figure 1:
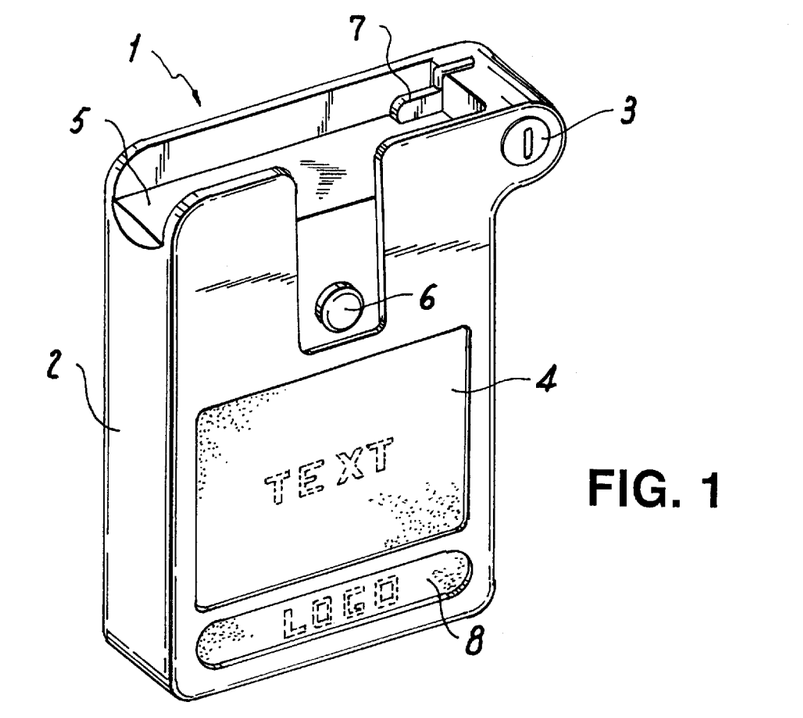
FIG. 1 is an isometric front view of the door answering machine of the present invention.
Figure 2:
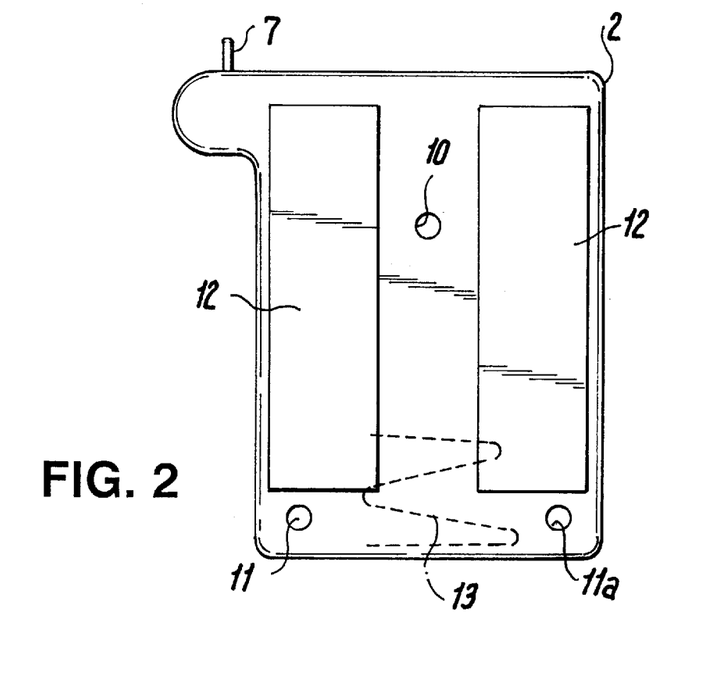
FIG. 2 is a rear back view of the door answering machine of the present invention.

A front isometric view of this first embodiment for door answering machine 1 is shown in FIG. 1; and a rear back view is shown in FIG. 2. Since the size, shape and location of the record buttons vary from model to model, lockable holder 2 of door answering machine 1 is custom designed to match the features of recorder 2, such as a particular personal message recorder.

Door answering machine 1 includes lockable holder 2 and recorder 5. Holder 2 is manufactured as a metal die casting, a sheet metal fabrication, or as an injection molded part in a high impact resin such as ABS. The purpose of holder 2 is to attach recorder 5 to a door or door jamb surface for easy use, to permit access to record button 6, to deny access to the remaining control buttons of recorder 5, and to prevent easy theft of recorder 5.

Key lock 3 locks tang 7 in a horizontal position to prevent removal of recorder 5; and a key (not shown) is used to position tang 7 vertically to permit removal of recorder 5.

A visually readable or Braille readable note 4 of readable indicia instructs the user to record a short message in the event that the door is not answered by the occupant.

In operation, visitors leave recorded messages; and later, the occupant then removes recorder 5 (using his or her key) from holder 2 and play back the recorded messages. Then recorder 5 is returned to holder 2 and locked in place. Holder 2 is attached to the door or adjacent surfaces thereof in either one of two ways (or both for increased security).

For example, FIG. 2 shows two adhesive strips 12 of high bond tape with a peel-off release liner. Adhesive strips 12 can be used for quick attachment. A typical example of such an adhesive tape is that of 3-M Company's VHB double-sided tape, which is an appropriate choice.

FIG. 2 also shows one or more holes 10,11, and 11*a,* such as three holes, including top hole 10 and bottom holes 10, 11 and 11*a,* can be used for screw mounting of door answering machine 1 to a surface, such as a door or door jamb. Top hole 10 is accessible from the front when recorder 5 is removed.

Removable logo strip 8 of FIG. 1 hides two front panel screw access holes in positional registration with bottom holes 11 to permit screw access for mounting. Leaf spring element 13 pushes recorder 5 up for easy removal when tang 7 is unlocked in the vertical position. Recorder 5 is simply pushed down against resistance from spring 13 when locking in place within holder 2.

Some personal message recorders such as the "Voice Memo" model 63-944 from Radio Shack Corporation have a system requiring two successive pushes on the record button for operation. The first push turns on recorder 5 to permit recording a message; the second push turns off recorder 5. Although this model has a "voice operated" feature which conserves solid-state message space, if the second push on the record button is not made after the recording, the machine stays on and wastes battery power. Also, it is difficult to explain this "two-push" operation to someone not familiar with recorder 5. It is almost impossible to insure that users adhere to the procedure; which results in frequent "dead batteries".

Figure 3:
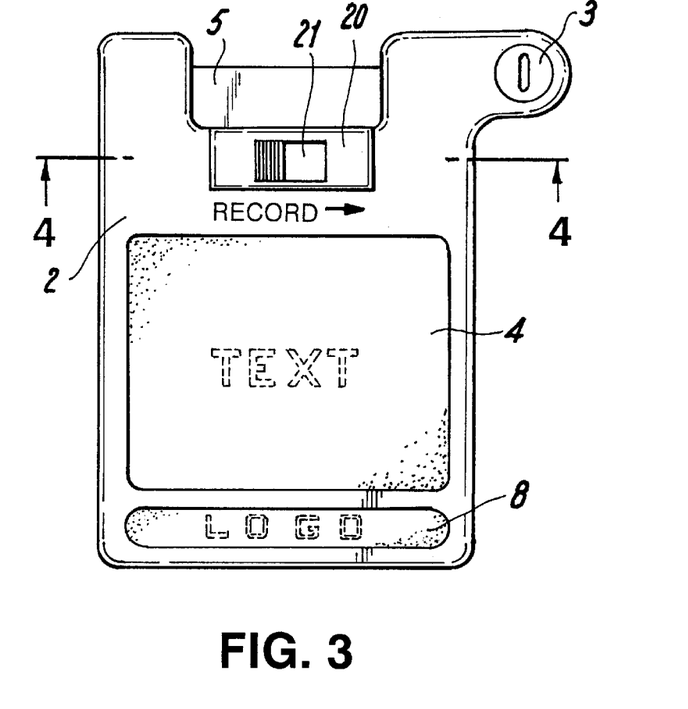
FIG. 3 is a front elevational view of the door answering machine with a "conversion" record button.

Therefore, FIG. 3 shows modified holder 2 for recorder 5 of this type. Holder 2 of door answering machine 1 includes conversion accessory member 20 with sliding actuator 21, which slide switch actuator simply converts operation of recorder 5 to a "hold while recording" phase of use.

Figure 4:
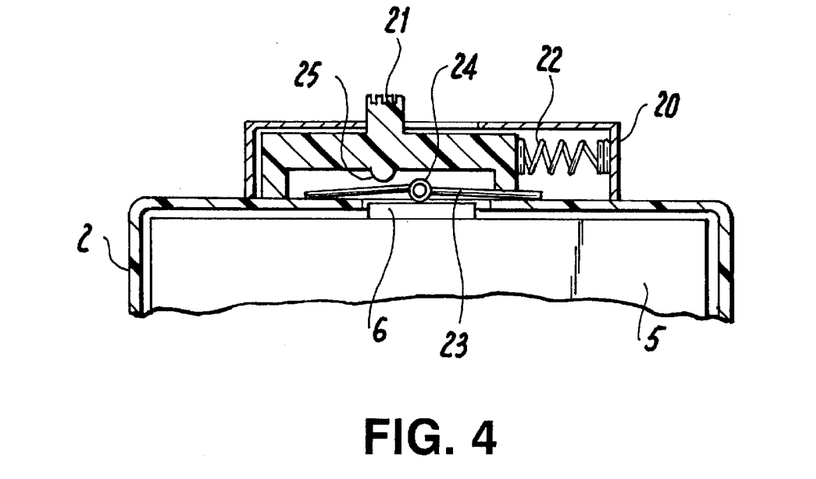
FIG. 4 is a cross sectional detail view of the "conversion" record button as in FIG. 3, taken along line "4—4"of FIG. 3.

The cross sectional lines in FIG. 4, which correspond to line "4—4" in FIG. 3, show the cooperating elements of conversion accessory member 20. For example, sliding actuator 21 includes nib bump 25 which engages raised section 24 on flexible diaphragm 23 momentarily on the excursion of sliding actuator 21 against pressure of spring 22. This momentary engagement of nib bump 25 of sliding actuator 21 with raised section 24 of flexible diaphragm 23 pushes record button 6 in, and then releases record button 6, upon further excursion of sliding switch actuator 21 This starts the recording process. Sliding switch actuator 21 is held by pressure against spring 22 until after recording of the message is completed.

Upon release of sliding actuator 21 by the user, spring 22 pushes sliding actuator 21 back to the left, again causing nib bump 25 to push raised section 24 momentarily against record button 6; which pushing action turns off recorder 5. Since record time is limited in these message recorders, the "hold while recording" procedure encourages desirably short messages.

The personal message recorders noted above, such as recorder 5, are not ideally configured for use as door answering machines although they can serve the purpose at low cost as described in two embodiments above. Alternatively, a preferred embodiment is shown as purposely designed solid-state recorder 33, as shown in FIGS. 5 and 6.

Recorder 33 is larger than the typical personal message recorder to afford more space for larger batteries with longer life. As shown in FIG. 6, this preferred embodiment of recorder 33 also has recess 45 in a bottom thereof, with spring 46 pushing engagement tang 47. This is part of a self locking feature which automatically locks recorder 33 in place in holder 30 without the use of the key in lock 31. Lock tang 48 has a sloping edge which forces engagement tang 47 to the left against spring 46 force when recorder 33 is pushed down until it locks in place in the notch in tang 48.

A key (not shown) may be used to unlock recorder 33 by rotating tang 48 away from engagement tang 47.

Figure 5:
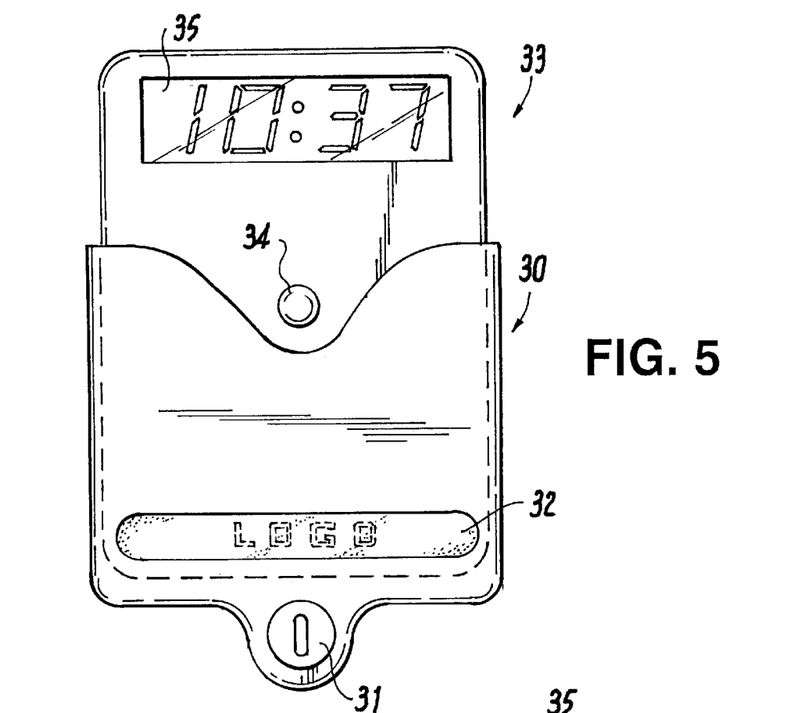
FIG. 5 is a front elevational view of a special purpose recorder in a holder.
Figure 6:
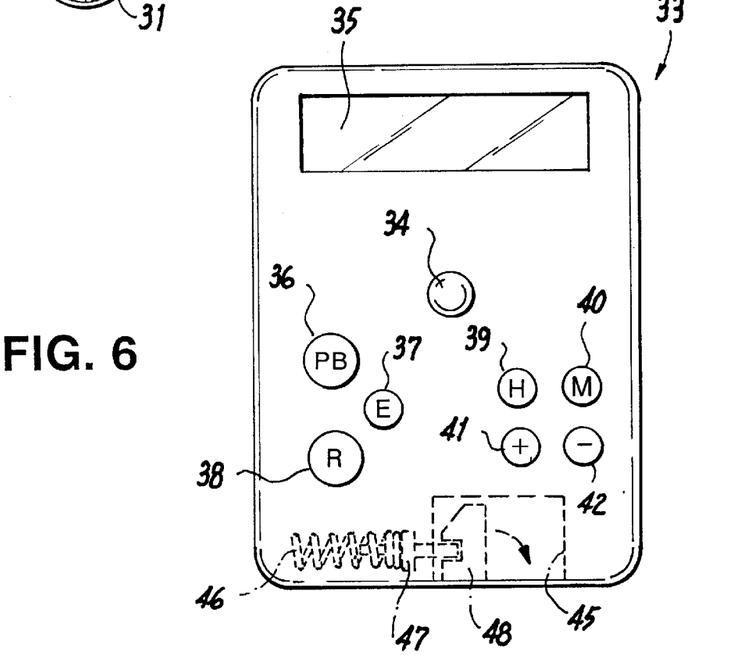
FIG. 6 is a front elevational view of the special purpose recorder, as in FIG. 5.

As shown in FIG. 5, recorder 33 has an optional time of day clock built-in with liquid crystal display 35. A "push while recording" button 34 is accessible to the visitor. The mounting options for holder 30 as discussed in the first embodiment apply here in also, including the use of a logo strip 32.

FIG. 6 also shows other buttons (36 through 42) which are only accessible when removed from holder 30. This purpose built recorder 33 has outgoing messages (OGM's) which make instructional note 4 used in the first two embodiments unnecessary. These out going messages (OGM's) can be either user recordable or can be factory supplied to reduce cost by eliminating the extra button and logic.

The out going message is presented to the visitor when the record button 34 is pushed. Typically, it says, "If no one is available to answer the door, please push the record button while recording a short message". If the message space is all used up, a different outgoing message would typically say, "Sorry we cannot answer the door, please leave a note or call again".

Solid-state recorders either use analog-to-digital conversion, data compression and digital memory recording, or they use a type of analog or "multi-level" recording. In this preferred embodiment, a single-chip voice record/playback device of the ISD33000 series type is used. Various chips in this series provide recording durations of one to four minutes. These chips are fully addressable multi-level array types and offer nonvolatile message storage with 100 year retention and 100,000 recording cycles. They are available from Information Storage Devices, Inc. They have on chip timing, input and output audio amplifiers and audio filters. These chips are designed to interface with a micro controller via a serial peripheral interface (SPI).

Figure 7:
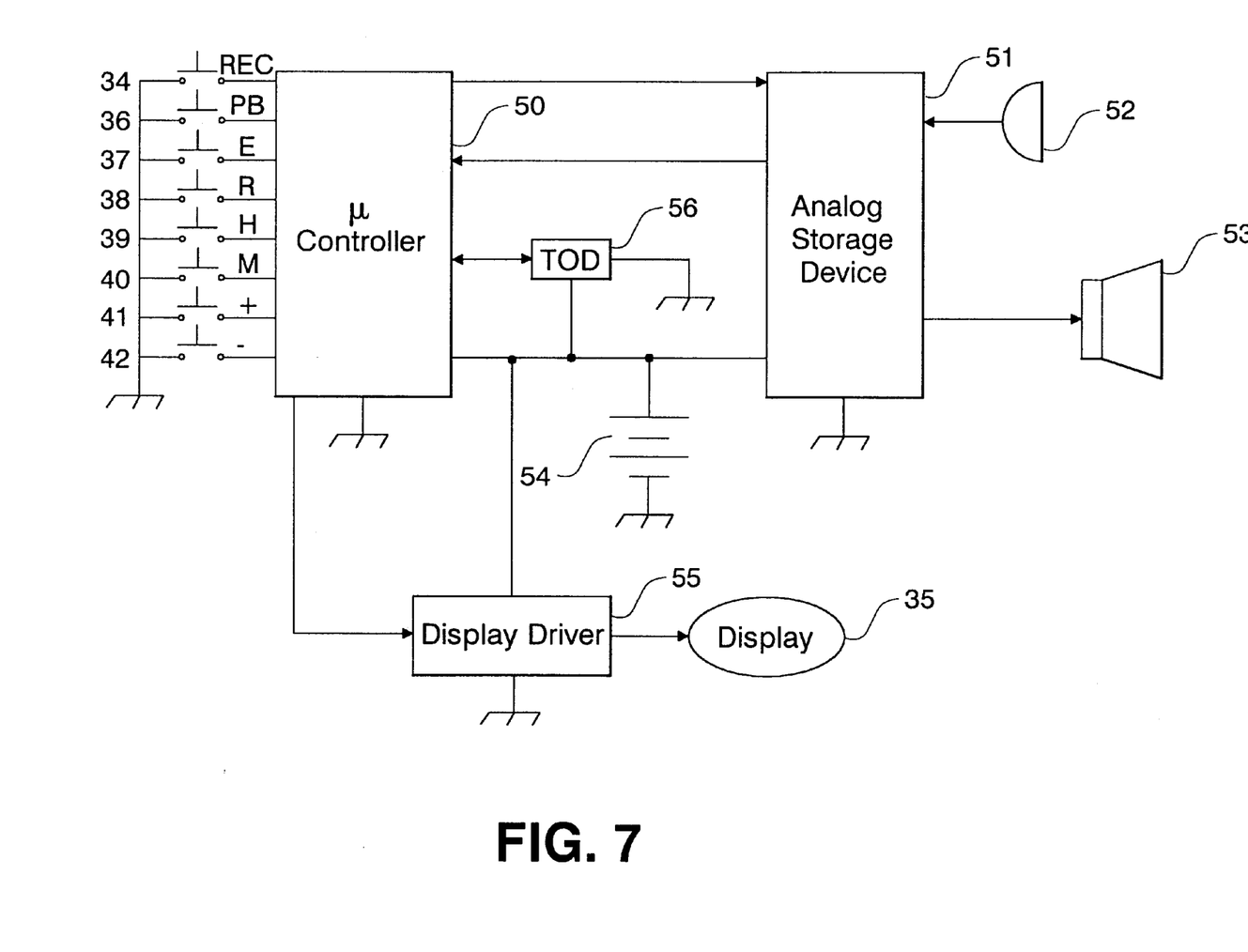
FIG. 7 is a block diagram of the special purpose recorder.

FIG. 7 shows a high level block diagram of recorder 33 with the time-of-day feature. The ISD33000 single-chip voice record/playback device 51 communicates with microcontroller 50 and also receives analog audio input from microphone 52 and drives audio output to loudspeaker 53. Time-of-day module 56 communicates with controller 50 although this feature can be built into controller 50. Display driver 55 drives time display 35; and display driver 55 may also be part of microcontroller 50. The record button is shown as reference numeral 34. Reference numeral 36 is the playback button, and reference numeral 37 is the erase button. Reference numeral 38 is the record button for out going message OGM1. This can be combined with simultaneous pressing of the playback button 36 to record outgoing message OGM2. The rest of the push buttons are for time set control. For example, H for hours, M for minutes, + to increase and − to decrease. A power source, such as battery 54 powers recorder 33.

Figure 8:
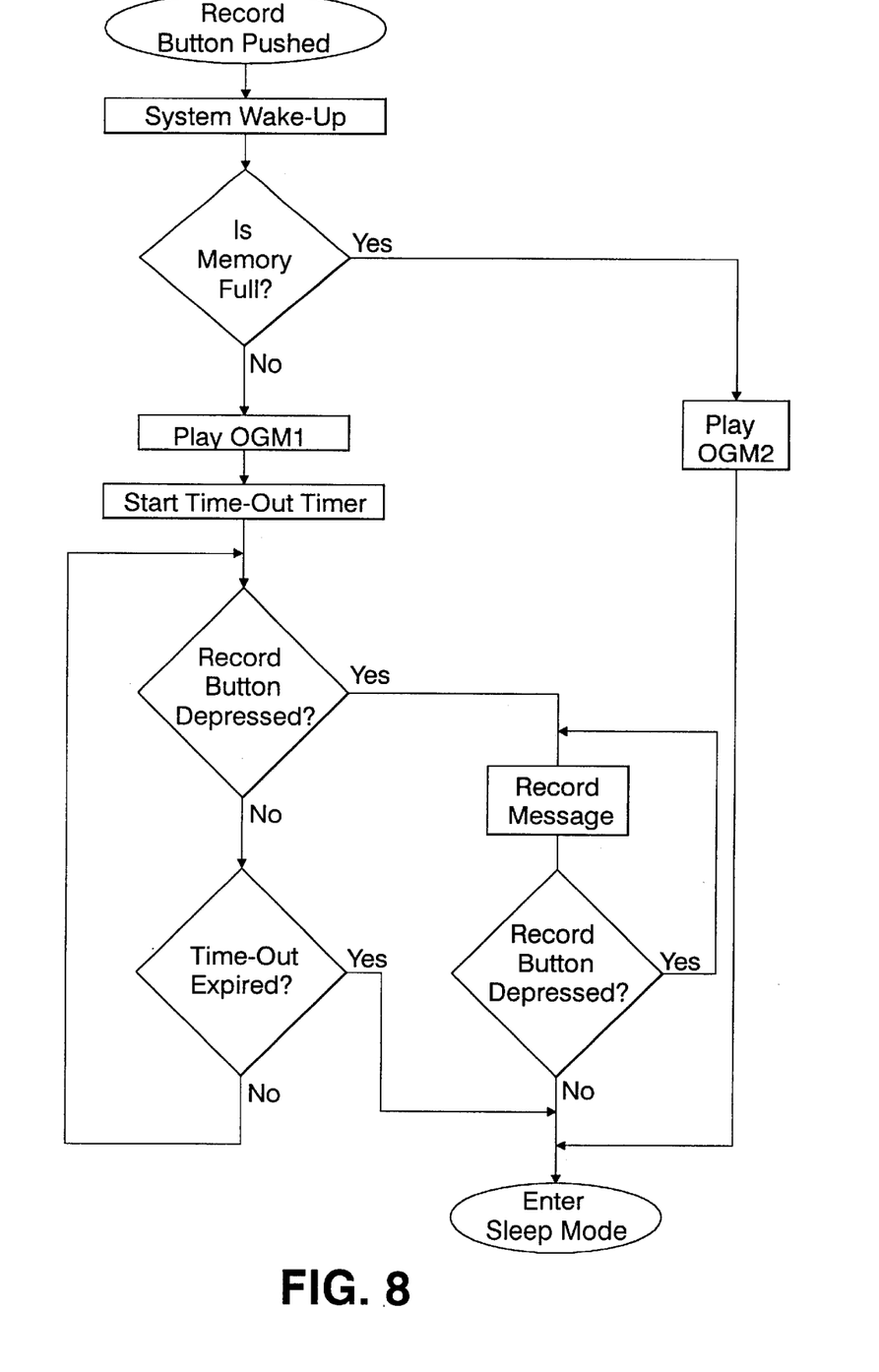
FIG. 8 is a flow chart of the "Message Recording" steps of the present invention.

FIG. 8 shows a flow chart of the "record a message" operation. Pushing record button 34 issues a system wake-up. If the memory is full, the second outgoing message OGM2 is played over the loudspeaker and the recorder is returned to sleep mode. If the memory is not full, the normal greeting of outgoing message OGM1 is played and a time-out timer is started. A control loop is now entered to monitor if the record button 34 is depressed before the time-out expires.

If the time-out expires before record button 34 is depressed, the system is returned to sleep mode. Otherwise the message is first recorded and then the system goes into sleep mode. The flow chart of FIG. 8 does not represent the time of day feature.

If the time of day feature is implemented, the time of day is recorded in the message storage as tone encoded information or as synthesized speech after the message is completed and just before the system is returned to sleep mode.

Upon playback, these tones are decoded and are used to display the message time on the time-of-day display, or if synthesized speech were recorded, the time would be audibly presented as part of the message playback.

Figure 9:
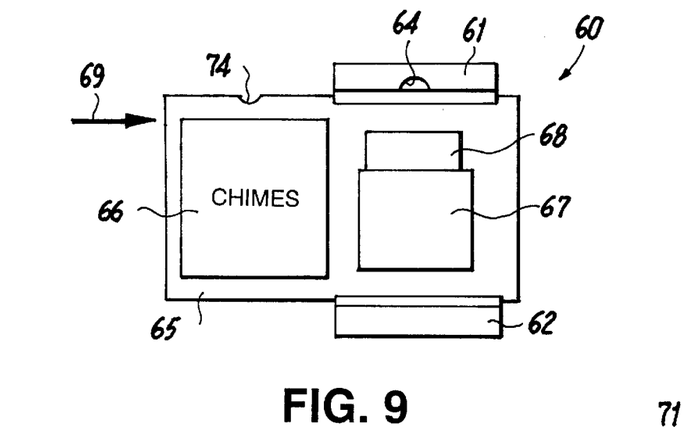
FIG. 9 is an inside door view of another embodiment for a door answering machine, shown with chimes.

As shown in FIG. 9, a further alternate embodiment of a door answering machine 60 calls for its attachment to the inside surface of a door with a single button 73 that penetrates the door 71 to an outer surface thereof. This alternative embodiment of door answering machine 60 is especially attractive in high vandalism areas or in areas of very cold temperatures which preclude reliable operation of externally mounted units.

An inside door view of this arrangement of door answering machine 60 within door 71 is presented in FIG. 9. Top rail 61 with spring loaded latch member 64 holds chassis plate 65 in slidable fashion to inside door surface 70a with the cooperation of bottom rail 62. On the left side of FIG. 9 there is shown chimes module 66 and on the right side is non-lockable holder 67 with message voice recorder 68. Chassis 65 can be moved in the direction of arrow 69 so that latch 64 engages notch 74. In the present view, a notch similar to notch 74 centered over recorder 68 is currently engaged with latch 64.

Figure 10:
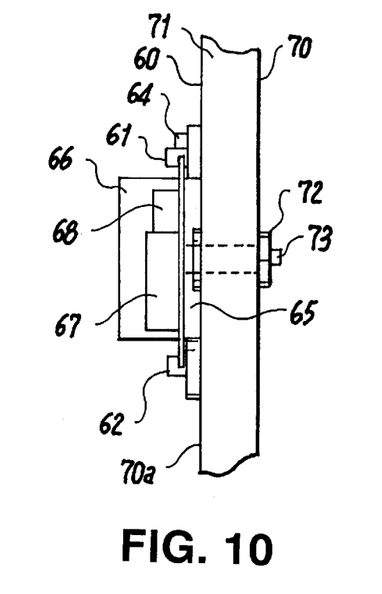
FIG. 10 is a side elevational view in detail of the door mounting for the door answering machine of the present invention.

The side view of FIG. 10 shows second button 73 in bezel fixture 72. Exterior button 73 is a long button which extends through the thickness of the door 71 from the outer surface 70 to the inner surface 70a thereof. Support rails 61 and 62 are bonded with high bond tape or screws to inside surface 70a of door 71.

When recorder 68 is centered and latched by latch 64, exterior button 73 is in registration with record button of recorder 68. When sound annunciator module 66, such as a door bell or a chimes module is latched by latch 64, the operating button of sound annunciator module 66 is in registration with button 73. Sound annunciator module 66 may be mechanical chimes of well known construction, or it may be a battery operated electronic annunciator of a wide variety of capabilities including simulated chimes, music or voice.

In this way, if the occupant is in and willing to answer the door, sound annunciator module 66 is slidably moved in place and latched. Exterior button 73 then operates the chimes of sound annunciator module 66. If the occupant is leaving or wants to screen visitors, recorder 68 is shifted into latching registration with exterior button 73. From the outside, a visitor does not know whether the chime will sound or an outgoing message will entreat him or her to leave a message.

Voice message recorder 68 is either of a solid state variety as described in the preferred embodiment, or it can be a tape recorder with a single outgoing message OGM. Since tape recorders have almost "unlimited" message capacity, a second outgoing message OGM for "tape full" would seldom be required. Other advantages of a tape recorder are removable media and generally better audio fidelity. Since they are less power efficient than solid-state message recorders, rechargeable batteries can be used.

Figure 12:
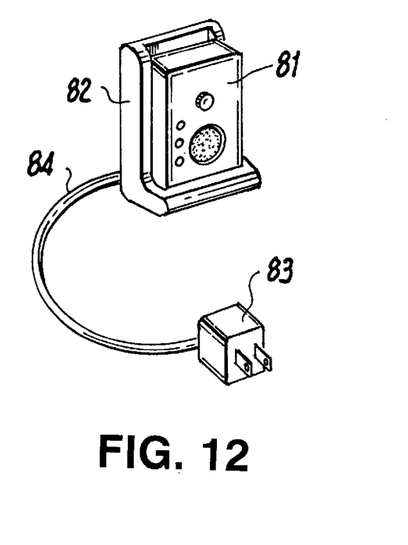
FIG. 12 is an isometric view of the recorder in a charging cradle.

As shown in FIG. 12, charging contacts on the bottom of message tape recorder 81 can be used to recharge message recorder 81 while not in use. FIG. 12 shows a charging cradle 82 supplied power by plug-in power module 83 via cable 84.

Figure 11:
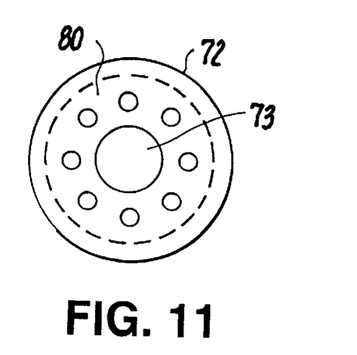
FIG. 11 is a front elevational view of a record button with a bezel for the present invention, as shown in FIGS. 9 and 10.

As shown in FIG. 11, regardless of the type of message recorder used, bezel 72 incorporates an array of sound holes 80 around button 73. These are necessary to carry sound in both directions through the door while using a single door penetration for installation. A flexible lightweight barrier (such as vinyl film) can be used as a draft barrier to prevent heat loss from sound holes 80; this barrier may be placed on the inside end of the button bezel assembly.

Figure 13:
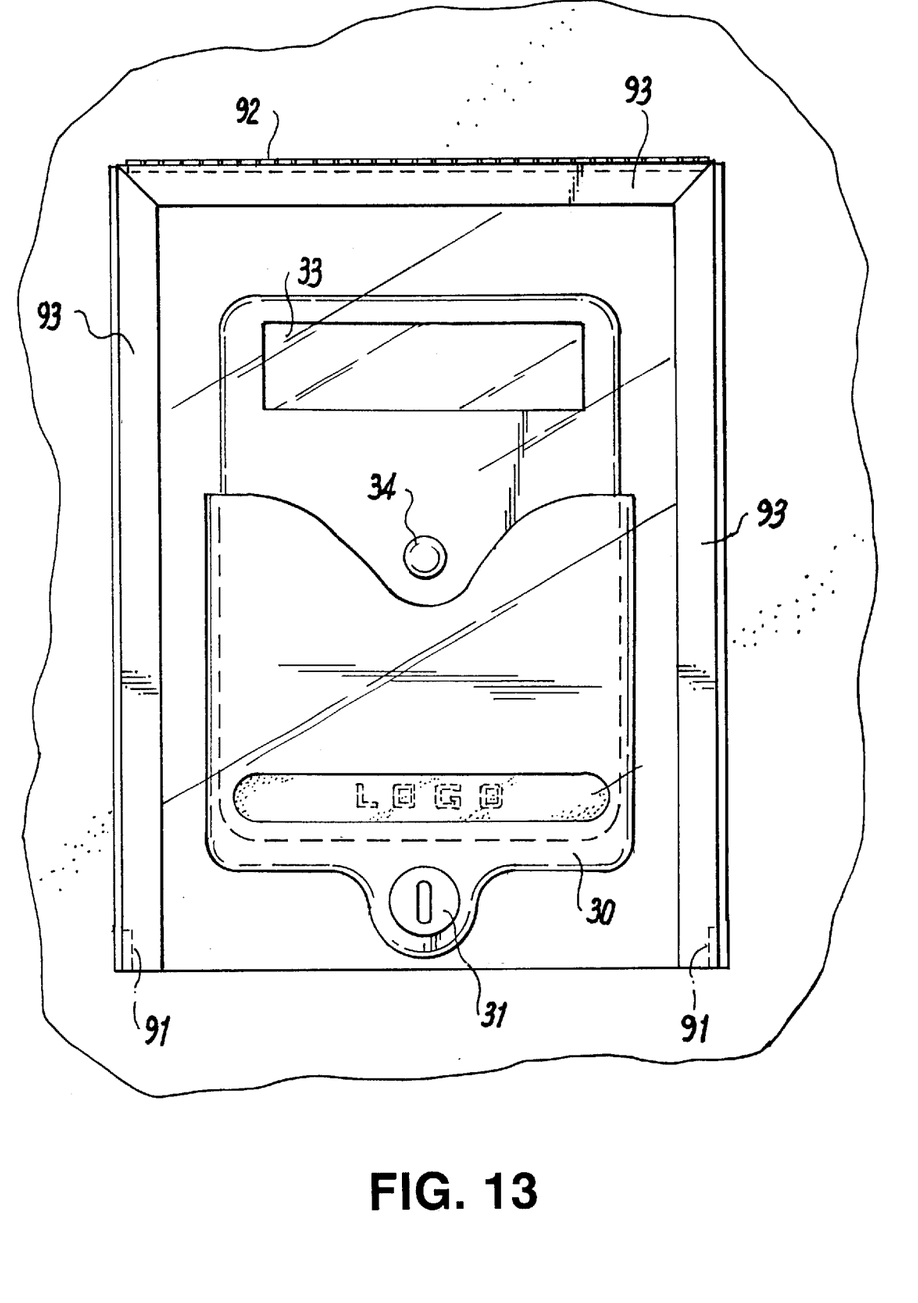
FIG. 13 is a front elevational view of a rain shield accessory for door answering machine of the present invention.
Figure 14:
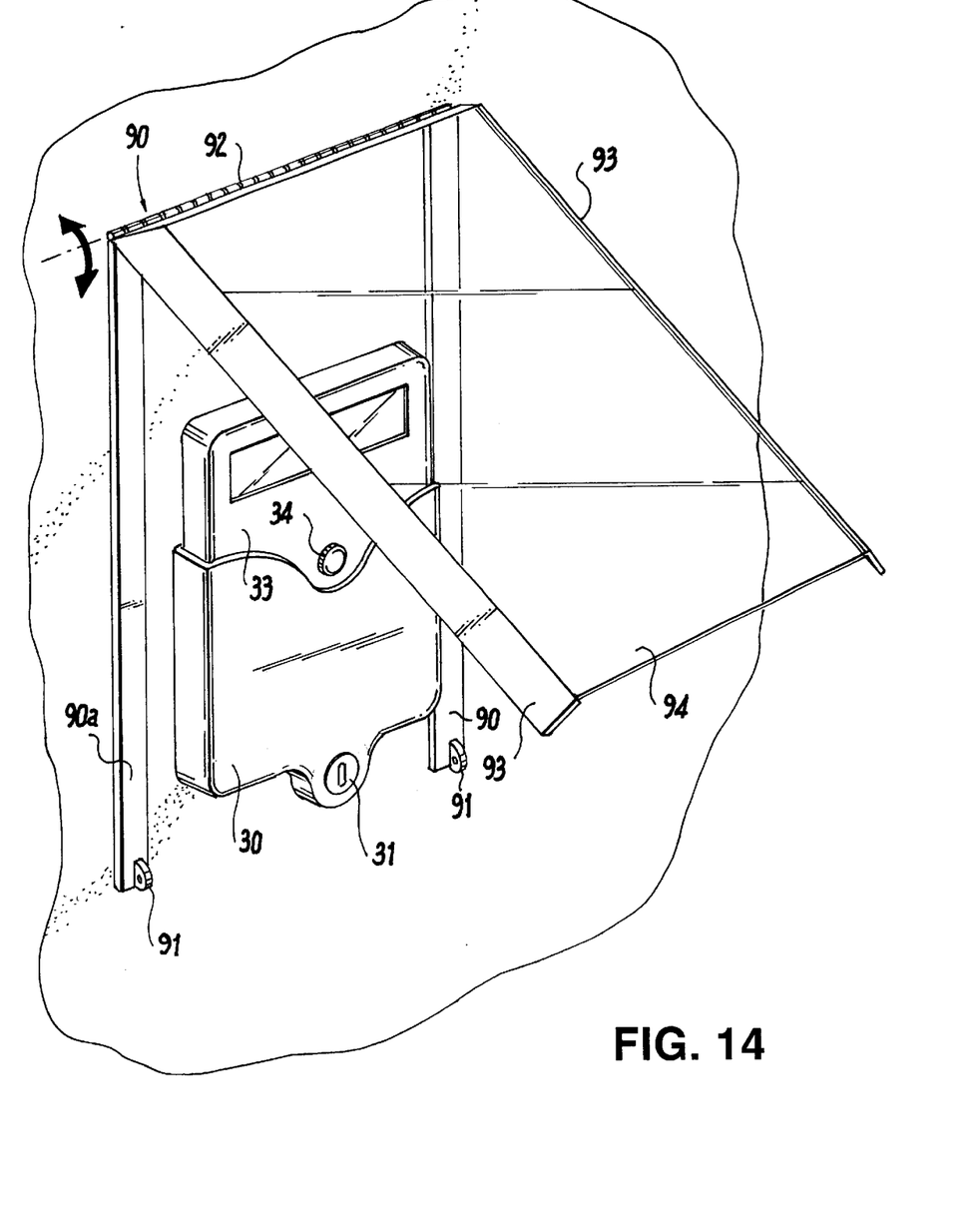
FIG. 14 is an isometric view of the rain shield accessory as in FIG. 13.

As shown in FIGS. 13 and 14, in areas where the door or entry way is not protected from rain, rain shield accessory 90 is used to protect the externally mounted door answering machine. As shown in an open position of FIG. 14, rain shield accessory 90 includes a hinged frame 93 with a flexible waterproof transparent film surface 94. Stationary frame member 90a is attached around the door answer machine 33 with adhesive, such as strips of high bond tape attached to its back side (or with screws).

High friction piano hinge 92 at the top edge of frame 90a permits hinged frame 93 to be swung open, as shown in FIG. 14, for removal of voice message recorder 33 from rain shield accessory 90.

If transparent film cover 94 is sufficiently flexible and sound transmissive, transparent film cover 94 can be left down in place, as shown in FIG. 13, while the record button is depressed to make a recording. Tabs 91 are used to latch frame 93 in the down position so as not to be lifted by wind. Frame 93 has molded "bumps" that are in registration for engagement with holes in tabs 91.

Figure 15:
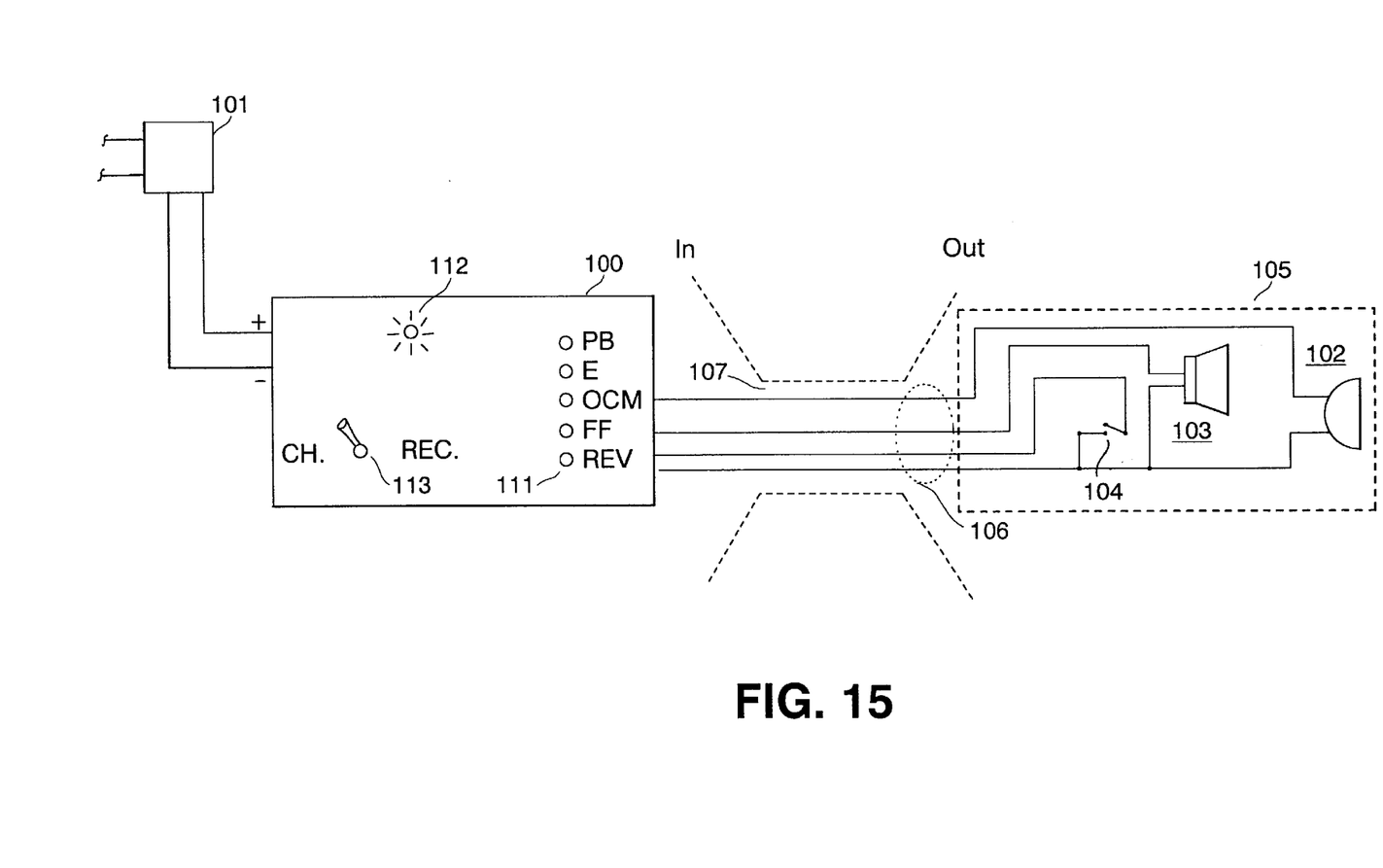
FIG. 15 is a block diagram of an indoor embodiment of the door answering machine of the present invention, with a wired exterior module; and, FIG. 16 is a block diagram of an indoor embodiment with a wireless exterior module.

FIG. 15 shows a block diagram of a preferred embodiment for an indoor recorder version of the present invention. The objectives of this embodiment are to eliminate or reduce the size of the required penetration through the door and to eliminate the need for battery power. Small exterior module 105 is surface mounted on the door frame, or on the exterior door surface. Module 105 encloses microphone 102, small loudspeaker 103, and momentary push-button 104 which serves the dual functions of "doorbell" and "record" buttons. A small four conductor flat ribbon cable 106 passes through small channel 107 in the door frame (or through a hole in the door such as a ¼" (6 mm.) hole) to communicate with interior module 100 which houses both the electronic annunciator as well as the special purpose message recorder of either solid-state or tape variety.

Control buttons 111 for the recorder function may include additional buttons for a time-of-day feature as discussed in the embodiments above. Switch 113 selects either the door answering machine function (which lights indicator 112) or the annunciator function which may simulate chimes. Wall mounted low voltage DC power supply 101 is plugged into a convenient AC wall outlet. Module 100 need not be mounted on the door; in fact, for ease of powering, a location on the wall or on the entry floor may be more convenient. However, interior door mounting for module 100 with exterior door mounting for module 105 as well as interior battery powering within module 100 is a viable option in lieu of power supply 101.

Figure 16:
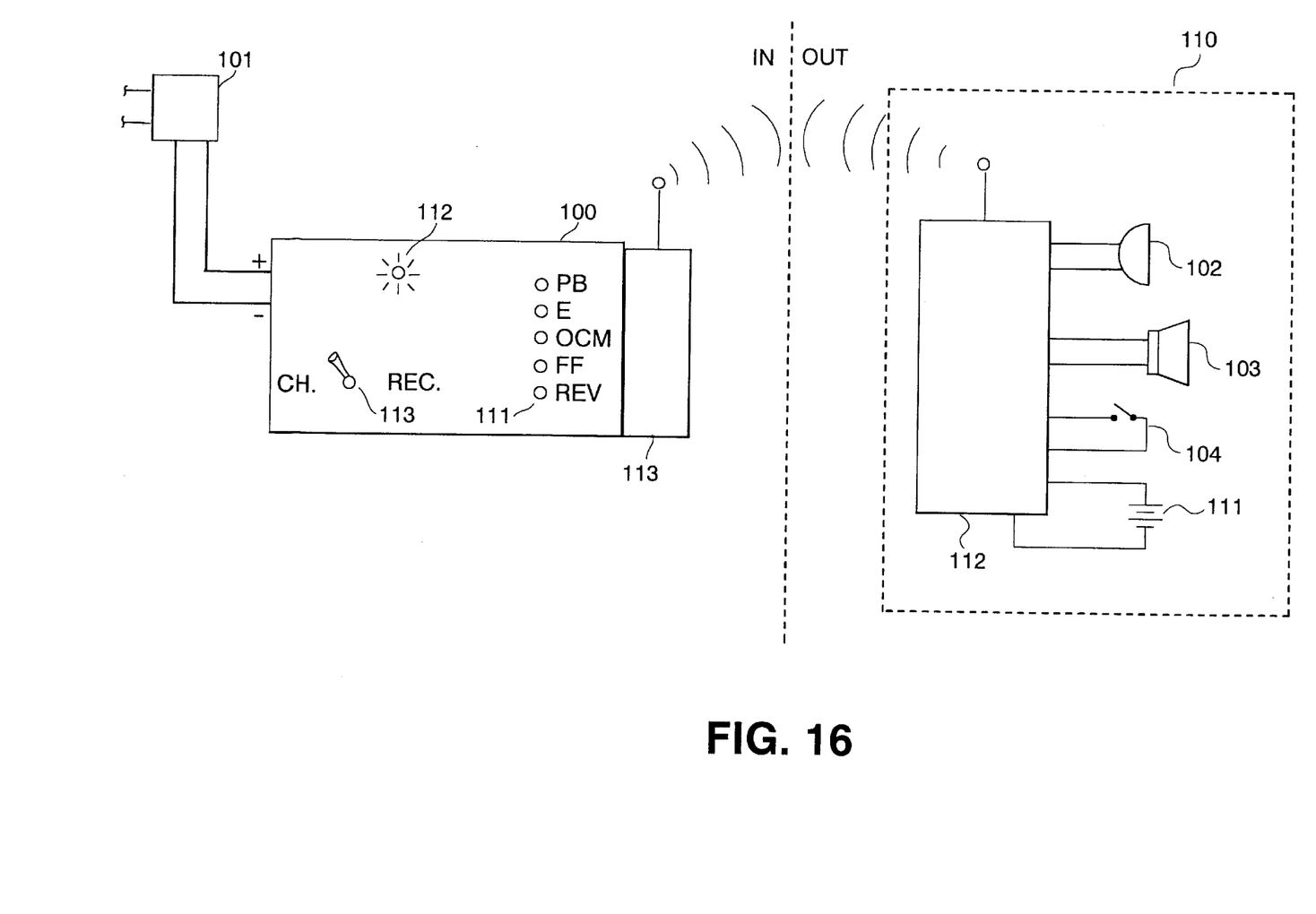

FIG. 16 shows a block diagram of an embodiment which substitutes a wireless radio link for the cable 106 of the last embodiment. Indoor transceiver 113 communicates with exterior transceiver 112 which is housed in a small surface mounted module 110 along with loudspeaker 103, microphone 102, momentary switch 104 and battery 111 to power transceiver 112. In this embodiment, indoor module 100, which is functionally equivalent to that of the last embodiment, interfaces with signals from transceiver 113 which also derives power from power supply 101. Transceiver 113 can, be integrated within the housing of indoor module 100. This embodiment offers maximum flexibility for placement of the outdoor 110 or indoor 100 modules with the addition of only one battery 111.

It is further noted that other modifications may be made to the present invention, without departing from the scope of the present invention, as noted in the appended claims.

I claim:

1. A door answering machine for use to record a short verbal message at a door of a building comprising:

a voice message recorder for recording verbal messages;

a power source for said voice message recorder for recording verbal messages;

a lockable holder for said voice message recorder;

said voice message recorder having a manually operable record function button, said manually operable record function button operating said voice message recorder;

a message retrieval and playback means for retrieving and playing hack said recorded verbal messages;

said lockable holder having a hollow interior for insertion of said voice message recorder for recording verbal messages therein;

said lockable holder having an access hole to permit access to a record button of said voice message recorder for recording verbal messages; and, said lockable holder denying access to other functional controls of said recorder.

2. The door answering machine as in claim 1 further comprising a means to hold said manually operable a record function button in an "ON" position of use during a duration of a user leaving a voice message thereat.

3. The door answering machine as in claim 1 further comprising a playback means for at least one outgoing messages from said door answering machine.

4. The door answering machine as in claim 1 further comprising a time display means and message time recording means.

5. The door answering machine as in claim 1 further comprising a means for mounting said door answering machine to a door.

6. The door answering machine as in claim 1 further comprising a means to alternatively shut off said voice message recorder for recording verbal messages and a means to replace said voice message recorder for recording verbal messages with a sound annunciator.

7. The door answering machine for use to record a short verbal message at a door of a building, as in claim 1 further comprising a lock for locking said voice message recorder for recording verbal messages within said lockable holder.

8. The door answering machine as in claim 7 wherein said lock comprises a movable tang movable to a position to prevent removal of said voice message recorder, said voice message recorder urged against said tang by a spring applying spring pressure against said voice message recorder.

9. The door answering machine as in claim 1 wherein said lock comprises a recess in a bottom of said holder, said recess having a spring engagable with a movable tang, said movable tang automatically locking said voice message recorder in place in said holder, said lock further having a further tang having a sloping edge, said further tang nagging said tang with spring force when said voice message recorder is pushed down until said voice message recorder is locked in place.

10. The door answering machine as in claim 1, further comprising a readable note of readable indicia to instruct the user to record a short message in the event that the door is not answered by the occupant of the building.

11. The door answering machine as in claim 1 further comprising a means for holding said manually operable record function button operating said voice message recorder in an "ON" position while a user records a message, said holding means further comprising means for temporarily turning said voice message recorder to an "OFF" position.

12. The door answering machine as in claim 11 wherein said holding means further comprises a slide switch actuator, said slide switch actuator having a nib bump momentarily engagable with a raised section on a flexible diaphragm upon a sliding excursion of said slide switch actuator against pressure of a spring, wherein the momentary engagement of said bump of said slide switch actuator with raised section of said flexible diaphragm alternately urges said record button and then releases said record button upon a reverse sliding excursion of said sliding switch actuator.

13. The door answering machine as in claim 1 further comprising an outgoing message (OGM) record/playback means, said outgoing message (OGM) record/playback means operable upon depression of said record button by the user.

14. The door answering machine as in claim 13 wherein said voice record/playback means communicates with a microcontroller and receives analog audio input from a microphone, said microcontrooler driving an audio output it a loudspeaker.

15. The door answering machine as in claim 14 further comprising a time-of-day module communicating with said microcontroller, said time-of-day module further having a display driver driving a time display.

16. The door answering machine as in claim 13 further comprising an outgoing message only playback means, said outgoing message only playback means operable when a predetermined filled memory of recorded messages has been entered in said voice message recorder, wherein further if said predetermined memory of recorded messages is not full, said first outgoing message is played and a time-out timer is started and a control loop is entered to monitor if said record button is still depressed by the user before a predetermined time-out period of time expires.

17. The door answering machine as in claim 1 wherein said lockable holder comprises a top rail and a bottom rail accommodating said voice message recorder therebetween.

18. The door answering machine as in claim 17 wherein said lockable holder further comprises a slidable chassis plate slidable upon said bottom rail for alternatively sliding said voice message recorder or a sound annunciator module into operable position at the door in positional register with a common manually operable exterior button extending through the door.

19. The door answering machine as in claim 18 wherein said top rail includes a spring located latch member holding said chassis plate in slidable fashion to an inside door surface in cooperation with said bottom rail, wherein said sound annunciator module is located on one side of said chassis plate and said holder for said voice message recorder is located on another side of said chassis plate, wherein said chassis plate is movable so that said latch member engages a corresponding notch in said chassis plate.

20. The door answering machine as in claim 19 wherein said manually operable button is engagable with a bezel fixture, said bezel fixture incorporating an array of sound holes around said manually operable button, said array of sound holes carrying sound in both directions through the door.

21. The door answering machine as in claim 20 wherein when said recorder is centered and latched by said latch member, said manually operable exterior button is in positional registration with said record button of said voice message recorder, and when said sound annunciator module is latched by said latch member, an operating button of said sound annunciator module is in positional registration with said manually operable exterior button.

22. The door answering machine as in claim 19 further comprising a pair of charging contacts located on a bottom of said voice message recorder for recharging said voice message recorder while not in use, said charging contacts engagable with corresponding contacts within a charging cradle, said charging cradle supplying power by a plug-in power module.

23. The door answering machine as in claim 1 further comprising a rain shield enclosure including a waterproof, transparent and sound transmissive cover covering said voice message recorder for recording verbal messages.

24. The door answering machine as in claim 23 wherein said rain shield enclosure further comprises a hinged frame with a flexible waterproof transparent film surface, said hinged frame having a high friction piano hinge at a top edge of said frame, permitting said transparent, sound transmissive cover to be swung open, for removal of said voice message recorder from said rain shield enclosure.

* * * * *